United States Patent
Kim et al.

(10) Patent No.: US 6,691,948 B1
(45) Date of Patent: Feb. 17, 2004

(54) HIGH TORQUE ROCKET NOZZLE

(75) Inventors: Steven S. Kim, Crofton, MD (US); Brian E. Krzewinski, Laurel, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/413,182

(22) Filed: Apr. 10, 2003

(65) Prior Publication Data (65)

(51) Int. Cl.⁷ .................................. F42B 10/00
(52) U.S. Cl. .................... 244/3.23; 244/3.22
(58) Field of Search .................... 244/3.23, 3.21; 160/222, 224; 239/265.19, 265.37

(56) References Cited

U.S. PATENT DOCUMENTS

| | | | |
|---|---|---|---|
| 33,089 A | 8/1861 | Ketchum | 244/3.3 |
| 2,611,317 A * | 9/1952 | Africano | 244/3.23 |
| 2,979,285 A | 9/1961 | Planitzer | 244/3.21 |
| 3,260,205 A | 7/1966 | Dietrich | 244/3.23 |
| 3,414,217 A * | 12/1968 | Kesting | 244/3.23 |
| 4,194,706 A * | 3/1980 | Detalle | 244/3.23 |
| 4,497,460 A | 2/1985 | Thorsted et al. | 244/3.3 |
| 4,546,940 A | 10/1985 | Andersson et al. | 244/3.29 |
| 4,565,340 A | 1/1986 | Bains | 244/3.28 |
| 4,708,304 A | 11/1987 | Wedertz et al. | 244/3.26 |
| 4,745,861 A | 5/1988 | Fenton et al. | 102/377 |
| 4,936,218 A * | 6/1990 | Wosenitz | 102/503 |
| 4,964,593 A | 10/1990 | Kranz | 244/3.24 |
| 4,995,318 A * | 2/1991 | Stidston et al. | 102/503 |
| 4,995,573 A | 2/1991 | Wallow | 244/3.24 |
| 5,004,186 A | 4/1991 | Hans et al. | 244/3.25 |
| 5,020,436 A | 6/1991 | Coburn | 102/377 |
| 5,417,393 A | 5/1995 | Klestadt | 244/3.27 |
| 5,511,745 A * | 4/1996 | Faupell et al. | 244/3.22 |
| 5,685,503 A | 11/1997 | Trouillot et al. | 244/3.28 |
| 6,247,666 B1 | 6/2001 | Baker et al. | 244/3.21 |
| 6,450,443 B1 * | 9/2002 | Kim | 244/3.23 |
| 6,548,794 B2 * | 4/2003 | Facciano et al. | 244/3.1 |

* cited by examiner

*Primary Examiner*—Tien Dinh
(74) *Attorney, Agent, or Firm*—Mark Homer

(57) ABSTRACT

A high torque nozzle system for a tube launched rocket has a fixed position nozzle on the rocket and a set of internally positioned erodible vanes inside of the nozzle. The vanes erode as the rocket exits the launcher. The high torque nozzle system has a first section of a rocket nozzle body, a second section of the rocket nozzle body and a torque ring that contains erodible vanes. The torque ring is fitted into a groove formed by the first and second sections of the rocket nozzle body, which are threaded together.

20 Claims, 1 Drawing Sheet

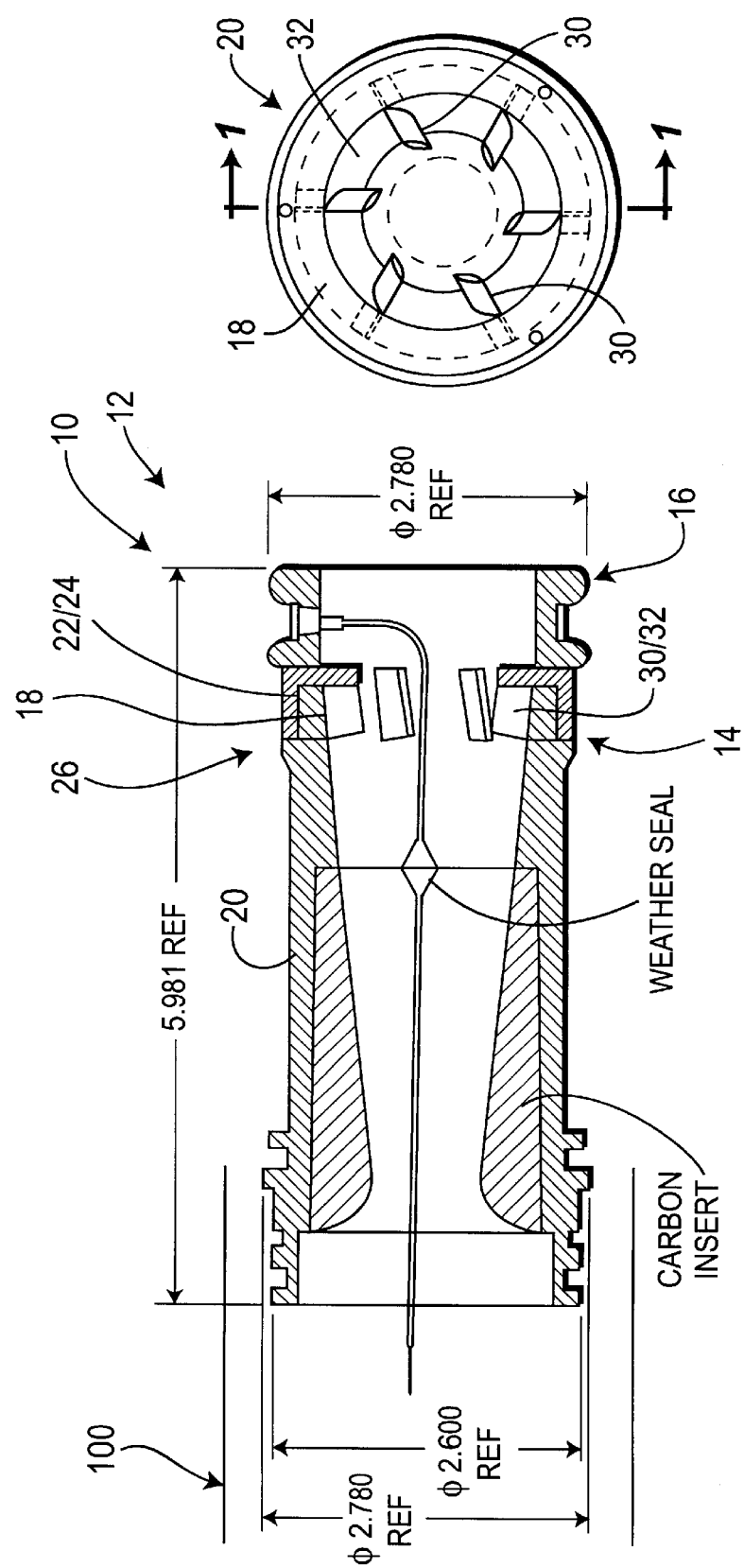

HIGH TORQUE ROCKET NOZZLE

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

1. Field of the Invention

The present invention relates to rocket torques vanes fitted within rocket nozzles. More particularly, the rocket nozzles of the present invention possess torque vanes that are fitted between two sections of the rocket nozzle. The torque vanes erode during launch of the rocket from the rocket launcher. Most particularly, the erodible torque vanes are easily assembled into the rocket nozzle prior to launch of the rocket, while providing an appropriate torque to the rocket up to the time period of between immediately prior to and just after rocket exit from the rocket launcher.

2. Brief Description of the Related Art

The 2.75-Inch rocket nozzle of the MK 66 MOD 4 Rocket Motor currently in use by the United States Navy contains flutes machined into the nozzle body of the rocket. These flutes provide a maximum torque of 3 ft-lb, resulting in a rocket spin rate at launcher exit of 8 Hz. Problematic with the 2.75-Inch rocket nozzle is the fact that the 3 ft.-lbs. of torque does not shut-off during the motor burn. A fin assembly on the 2.75-Inch Rocket provides an anti-spin component to the rocket to prevent the rocket motor from suffering a catastrophic reaction as it spins into its bending mode frequency.

There is a need in the art to reliably provide increased torque to rockets, particularly the 2.75-Inch rocket, while allowing the elimination of the torque after rocket launch. The present invention addresses this and other needs.

SUMMARY OF THE INVENTION

The present invention includes a high torque nozzle system for a tube launched rocket comprising a first section of a rocket nozzle body, a second section of the rocket nozzle body and a torque ring having a plurality of erodible vanes thereon, wherein the first and second sections of the rocket nozzle body are capable of being interconnected fixing the torque ring within a groove therebetween.

The present invention also includes a method for imparting a spin on a rocket, comprising the steps of providing a high torque nozzle system for a tube launched rocket comprising a first section of a rocket nozzle body, a second section of the rocket nozzle body and a torque ring having a plurality of erodible vanes thereon, wherein the first and second sections of the rocket nozzle body are interconnected fixing the torque ring within a groove therebetween and launching the rocket from the launch tube, wherein the plurality of erodible vanes erode.

The present invention further includes a rapid spin rocket product produced by the method comprising the steps of providing a high torque nozzle system for a tube launched rocket comprising a first section of a rocket nozzle body, a second section of the rocket nozzle body and a torque ring having a plurality of erodible vanes thereon, wherein the first and second sections of the rocket nozzle body are interconnected fixing the torque ring within a groove therebetween and launching the rocket from the launch tube, wherein the plurality of erodible vanes erode.

The present invention is particularly useful on a 2.75-Inch rocket.

BRIEF DESCRIPTION OF THE DRAWINGS

FIG. 1 shows a side cut away view of a rocket nozzle section of the present invention having two threaded sections holding an erodible torque vane ring therebetween; and, FIG. 2 is a cross-sectional rear view of the present invention showing the torque ring containing a plurality of torque vanes secured between two rocket nozzle sections.

DETAILED DESCRIPTION OF THE PREFERRED EMBODIMENT

The present invention provides a high torque nozzle for a rocket system having erodible vanes, particularly the 2.75-Inch rocket. The erodible high torque vanes are internally positioned inside of the rocket nozzle to impart torque to the rocket during rocket launch from a rocket launcher. The erodible vanes of the present invention improve the precision of the rocket by removing the vanes, and accordingly removing the torque from the rocket, as the rocket leaves the rocket launcher. Additionally, imprecision occurs from thrust misalignment that is due to the tolerance stack-ups at the nozzle and motor joint. The nozzle of the present invention increases the rocket spin rate at launcher exit from about 8 Hz to about 40 Hz. By increasing the rocket spin rate, the thrust misalignment averages out, minimizing its precision error contribution. This high rocket motor spin rate at launch significantly improve rocket precision.

As seen in FIG. 1, a high torque nozzle system 10 for a tube launched rocket 12 of the present invention includes the rocket 12 having a fixed position nozzle 20. Inside of the fixed position nozzle 20, and aft of the propelling thrust of the rocket 12, are a set of internally positioned erodible high torque vanes 30. During launch, the high torque vanes 30 impart rapid spin to the rocket 12 from rocket ignition to exit of the rocket 12 from a launch tube 100. Prior to, concurrent with, or just after the rocket 12 exits the launch tube 100, the vanes 30 are eroded and removed from being influenced by the propelling thrust of the rocket 12. The high torque nozzle system 10 may further include a spin neutral fin assembly 26 located on the outside of the nozzle 20 for rocket 12 guidance.

Referring to FIG. 1, the high torque nozzle system 10 has two sections, a first section of a rocket nozzle body 14 and a second section of the rocket nozzle body 16. These two body sections 14 and 16 interconnect to hold the torque vanes 30 in place. A plurality of erodible torque vanes 30 are attached to a torque ring 32, which is fitted or anchored between the first 14 and second 16 sections of the rocket nozzle body within a groove 18 formed by the connecting first 14 and second 16 sections of the rocket nozzle body.

When the first 14 and second 16 sections of the rocket nozzle body are connected, the two sections 14 and 16 form the groove 18 suitable for fixing the torque ring 32 within the fixed position rocket nozzle 20. The groove 18 includes an open area between the first 14 and second 16 rocket body sections that allows the torque ring 32 to fit therein, or may preferably include indentations or cavities that seat the torque ring 32 into the body of the nozzle 20. The two sections 14 and 16 are connected by any suitable mechanism for holding 22 the two sections 14 and 16 together, such as latching, hooking, screwing, adhering and the like, with the appropriate holding mechanism 22 being determinable by one of ordinary skill in the art in light of the disclosure herein. Preferably, the high torque nozzle system 10 is preferably configured for the first 14 and second 16 sections of the rocket nozzle 20 connect by a threaded mating connection 22 that permits the two sections 14 and 16 to be screwed or threaded together. Most preferably the threaded mating connection 22 threads in a counterclockwise orientation (looking longitudinally along the rocket 12 from the aft end forward), and as such the imparted spin of the launching rocket 12 further rotationally forces the first 14 and second 16 rocket body sections together at the threaded connection 22 where two sections 14 and 16 are mated together.

The high torque nozzle system 10 preferably further includes an adhesive 24 to fix the torque ring 32 within the groove 18 between the first 14 and second 16 sections of the rocket nozzle 20. The adhesive 24 may include any appropriate gluing or bonding substance for holding the torque ring 32 in a fixed rotational position between the first 14 and second 16 rocket body sections while being exposed to the heat and stress forces of rocket launch, with the appropriate type and amount of adhesive 24 being determinable by one skilled in the art through normal experimentation. Preferred adhesives 24 include heat resistant epoxy adhesives.

The torque vanes 30 are removed from the propelling thrust of the rocket 12 by eroding. After launch, the erodible vanes 30 are not needed to slow the rocket 12 spin because the torque shut-offs at launcher tube 14 exit with the removal of the torque vanes 30. Connecting two nozzle body sections 14 and 16 together to attach the torque ring 32 within the nozzle 20, which extends the erodible torque vanes 30 internally in the nozzle 20 body, reliably prevents ejection of the torque ring 32 from the rocket 12. Any appropriate number of erodible torque vanes 30 may be used, preferably from about 4 or more, more preferably from about 6 to about 12, and most preferably from about 8 to about 10 erodible torque vanes 30 are used. The erodible vanes 30 are attached to and incorporated into the torque ring 32 in any appropriate arrangement, preferably in equal distances along the inner surface of the torque ring 32. The individually torque vanes 30 are attached to the torque ring 32 in a manner that allows the torque ring 32 to be placed within the formed groove 18 between the first 14 and second 16 rocket body sections, while allowing the torque vanes 30 to be within the rocket thrust during launch to provide torque. Preferably, each of the erodible torque vanes 30 are identical to the other erodible vanes 30 on the torque ring 32. The torque ring 32 of the high torque nozzle system 10 may include a ring structure 34 connected to the plurality of erodible vanes 30 separately connected, as a single molded piece, or in combinations thereof. In the form of a single molded piece, the ring structure 34 is preferably formed from the same composition of the torque vanes 30.

For the 2.75-Inch Rocket, the dimensions of the erodible torque vanes 30 are from about 0.5 inches to about 0.7 inches in length, from about 0.06 to about 0.12 inches in width, and from about 0.2 to about 0.3 inches in depth. The erodible torque vanes 30 extend from about 0.2 inches to about 0.3 inches into the rocket nozzle 20.

The plurality of erodible torque vanes 30 are composed of any suitable composition for erosion from rocket thrust heat and high imparted rocket torque within the appropriate time period during launch of the rocket 12. The selection of the material is determinable by those skilled in the art for a material that effectively erodes during the expected 0.07 seconds, or other desirable time period, of operation of the erodible torque vanes 30. The composition may include, for example, plastic, thermoplastic, silica-phenolic, glass-phenolic, refractory metal, carbon-carbon, carbon-phenolic, graphite-phenolic and ceramic. Preferably the plurality of erodible torque vanes 30 comprise a thermoplastic composition or phenolic composition.

The high torque nozzle system 10 imparts a spin on the rocket 12 during rocket launch. By fixing the torque ring 32 between the first section 14 and second section 16 of the rocket nozzle 20 of the high torque nozzle system 10, the torque ring 32 retains a higher reliability for remaining fixed in place during launch. The formed groove 18 houses the torque ring 32 in a manner that prohibits torque ring 32 ejection from the launching rocket 20, which may occur in systems that do not have such a securing mechanism as used by the present invention.

In operation, the secured torque ring 32, having the plurality of erodible torque vanes 30, between the first 14 and second 16 sections of the rocket nozzle body remains longitudinally and rotationally fixed within the nozzle 20 as the rocket 12 is launched from the rocket launcher 100. As the rocket 12 exits the launcher 100, the torque vanes 30 that are within the thrust of the rocket 12 erode. This erosion of the torque vanes during rocket 12 exit occurs immediately prior to, concurrently with, or just after rocket launch from the launcher 100. As such, the rocket 12 may still be contained within the launcher 100 or within about 10 feet from the launcher 100 when the plurality of torque vanes 30 have eroded. The plurality of erodible torque vanes 30 erode in a manner to impart proper torque onto the launching rocket 12. For a 2.75-Inch Rocket, and other similar weapons, the plurality of erodible torque vanes 30 erode in from about 0.05 seconds to about 0.10 seconds after rocket launch (i.e., rocket ignition), such as for example about 0.07 seconds. The torque ring 32 preferably imparts from about 10 ft-lb or greater pounds of torque to the launched rocket 12, more preferably from about 10 ft-lb to about 15 ft-lb of torque to the launched rocket 12 for an approximate time of 0.07 seconds, which equates to expected rocket 12 exit from the launcher 100. The erodible torque vanes 30, in combination with the nozzle 20, preferably spin the rocket to about 40 Hz or more, which minimizes the effects of thrust misalignment. As the rocket 12 exits the launcher 100, the rocket 12 possesses low forward velocity and minimal gyroscopic stability. Perturbation, such as thrust misalignments and side winds, have a significant influence on the rocket's flight direction. As the torque vanes 30 erode, and "shut-off" the torque at launcher 100 exit, the rocket 12 spin rate does not exceed its first bending mode frequency, such as from about 50 Hz to about 60 Hz, which would have a catastrophic effect on the rocket 12.

Launch of the rocket 12 having the high torque nozzle system 10 of the present invention results in a rapid spin rocket. The rapid spin produced onto rocket 12 eliminates launch imprecision that occurs from thrust misalignment of the rocket nozzle 20 and motor joint. The rapid spin minimizes the precision error contribution by averaging out the thrust misalignment. The present invention achieves higher torque capability and better torque vane attachment than previously known. The launched rapid spin rocket generally has a greatly improved Circular Error Probable, preferably ranging from about 5 milliradians or less.

The high torque nozzle system 10 is particularly useful on rocket 12, such as a military surface or air-launched weapon. Most preferably the high torque nozzle system 10 is useful on the 2.75-Inch rocket currently used by the United States Navy and United States Marine Corps.

EXAMPLE 1

A precision analysis from a ground launch perspective was completed that predicted that the 2.75-Inch Rocket with erodible vanes attached between to nozzle body sections improved the rocket precision error from about 19-milliradians to about 5-milliradians.

EXAMPLE 2
(Prophetic)

The precision of the 2.75-Inch Rocket is improved with the incorporation of a torque ring secured in a groove between two nozzle body sections. The torque ring has eight erodible vanes equally spaced along the circumference of the torque ring. A heat resistant epoxy adhesive is applied to the groove prior to placement of the torque ring therein. The adhesive is allowed to dry. During launch the of the 2.75-Inch Rocket spin at launcher exit increases to about 40 hertz. At approximately 0.7 seconds from firing of the rocket, nozzle torque is shut-off at launcher exit. This occurs with the erodible torque vanes eroding and becoming flush with the inner surface of the nozzle body.

The 2.75-Inch Rocket Motor with the erodible torque vane is fired at a target with no effect on ballistic performance. The increased spin rate averages out thrust misalignment. The erodible vanes increase the rocket accuracy by approximately 360%.

EXAMPLE 3
(Prophetic)

The precision of the 2.75-Inch Rocket is improved with the incorporation of a torque ring secured in a groove between two nozzle body sections. The torque ring has ten erodible vanes equally spaced along the circumference of the torque ring. During launch the of the 2.75-Inch Rocket spin at launcher exit increases to about 40 hertz. At approximately 0.7 seconds from firing of the rocket, nozzle torque is shut-off at launcher exit. This occurs with the erodible torque vanes eroding and becoming flush with the inner surface of the nozzle body.

The 2.75-Inch Rocket Motor with the erodible torque vane is fired at a target with no effect on ballistic performance. The increased spin rate averages out thrust misalignment. The erodible vanes increase the rocket accuracy by approximately 360%.

EXAMPLE 4
(Comparative)

The rocket spin rate of the 2.75-Inch Rocket was increased to over 20 Hz with a molded plastic ring with erodible torque vanes. The molded plastic ring was glued into the end of the nozzle body. The plastic ring ejected from the 2.75-Inch Rocket about 50 percent of the time, causing hazardous debris.

The foregoing summary, description, examples and drawings of the invention are not intended to be limiting, but are only exemplary of the inventive features which are defined in the claims.

What is claimed is:

1. A high torque nozzle system for a tube launched rocket, comprising:
   a first section of a rocket nozzle body;
   a second section of the rocket nozzle body; and,
   a torque ring having a plurality of erodible vanes thereon, wherein the first and second sections of the rocket nozzle body are capable of being interconnected fixing the torque ring within a groove therebetween.

2. The high torque nozzle system of claim 1, further comprising an adhesive to fix the torque ring between the first and second sections of the rocket nozzle.

3. The high torque nozzle system of claim 2, wherein the adhesive comprises a heat resistant epoxy adhesive.

4. The high torque nozzle system of claim 1, wherein the first and second sections of the rocket nozzle are interconnectable by a threaded mating connection.

5. The high torque nozzle system of claim 1, wherein the torque ring comprises a ring structure connected to the plurality of erodible vanes as a single molded piece.

6. The high torque nozzle system of claim 1, wherein the plurality of erodible vanes comprise a composition selected from the group consisting of plastic, thermoplastic, silica-phenolic, glass-phenolic, refractory metal, carbon-carbon, carbon-phenolic, graphite-phenolic and ceramic.

7. The high torque nozzle system of claim 1, wherein the plurality of erodible vanes comprise a thermoplastic composition.

8. The high torque nozzle system of claim 1, wherein the plurality of erodible vanes comprise a phenolic composition.

9. The high torque nozzle system of claim 1, wherein the torque ring comprises a external spin neutral fin assembly.

10. The high torque nozzle system of claim 1, wherein the plurality of erodible vanes are internally positioned inside of the nozzle of the rocket.

11. A rocket comprising the high torque nozzle system of claim 1.

12. The rocket of claim 11, wherein the rocket comprises a 2.75 inch rocket.

13. A method for imparting a spin on a rocket, comprising the steps of:
   providing a high torque nozzle system for a tube launched rocket comprising a first section of a rocket nozzle body, a second section of the rocket nozzle body and a torque ring having a plurality of erodible vanes thereon, wherein the first and second sections of the rocket nozzle body are interconnected fixing the torque ring within a groove therebetween; and,
   launching the rocket from the launch tube, wherein the plurality of erodible vanes erode.

14. The method of claim 13, wherein the plurality of erodible vanes erode between about just prior to and just after rocket exit from the launch tube or before.

15. The method of claim 13, wherein the plurality of erodible vanes erode in from about 0.05 seconds to about 0.10 seconds after rocket launch.

16. The method of claim 13, wherein the torque vanes impart from about 10 ft-lb or greater pounds of torque to the launched rocket.

17. The method of claim 16, wherein the torque ring imparts from about 10 ft-lb to about 15 ft-lb of torque to the launched rocket.

18. A rapid spin rocket product produced by the method comprising the steps of:
   providing a high torque nozzle system for a tube launched rocket comprising a first section of a rocket nozzle body, a second section of the rocket nozzle body and a torque ring having a plurality of erodible vanes thereon, wherein the first and second sections of the rocket nozzle body are interconnected fixing the torque ring within a groove therebetween; and,
   launching the rocket from the launch tube, wherein the plurality of erodible vanes erode.

19. The product of claim 18, wherein the rocket comprises a 2.75 inch rocket.

20. The product of claim 18, wherein the launched rocket has a Circular Error Probable of from about 5 milliradians or less.

* * * * *